(12) United States Patent
Olsen et al.

(10) Patent No.: US 12,015,690 B2
(45) Date of Patent: Jun. 18, 2024

(54) AUTOMATED VALIDATION OF DATA SOURCES IN A MANAGED NETWORK

(71) Applicant: Ivanti, Inc., South Jordan, UT (US)

(72) Inventors: Gregory Paul Olsen, Lindon, UT (US); Blake Alan Thompson, Saratoga Spring, UT (US); Tanner Reese Lindsay, South Jordan, UT (US)

(73) Assignee: Ivanti, Inc., South Jordan, UT (US)

( * ) Notice: Subject to any disclaimer, the term of this patent is extended or adjusted under 35 U.S.C. 154(b) by 256 days.

(21) Appl. No.: 17/668,192

(22) Filed: Feb. 9, 2022

(65) Prior Publication Data

US 2023/0254111 A1 Aug. 10, 2023

(51) Int. Cl.
*H04L 9/00* (2022.01)
*H04L 9/40* (2022.01)
*H04L 67/1087* (2022.01)

(52) U.S. Cl.
CPC .......... *H04L 9/006* (2013.01); *H04L 63/0823* (2013.01); *H04L 67/1091* (2013.01)

(58) Field of Classification Search
CPC . H04L 9/006; H04L 63/0823; H04L 67/1091; H04L 9/3265; H04L 9/3268; H04L 63/166
See application file for complete search history.

(56) References Cited

U.S. PATENT DOCUMENTS

| | | | |
|---|---|---|---|
| 2005/0005097 A1* | 1/2005 | Murakawa | H04L 63/0823 713/156 |
| 2016/0219018 A1* | 7/2016 | Raman | H04L 63/101 |
| 2020/0028946 A1* | 1/2020 | Vora | H04L 1/1874 |
| 2020/0154275 A1* | 5/2020 | Louis | H04W 12/03 |
| 2021/0144004 A1* | 5/2021 | Gray | H04L 9/3265 |
| 2022/0029982 A1* | 1/2022 | Juma | H04L 63/0272 |
| 2022/0060771 A1* | 2/2022 | Choi | H04N 21/25816 |

* cited by examiner

*Primary Examiner* — Trong H Nguyen (57) ABSTRACT

An embodiment includes a method of client-server trust management. The method includes receiving, at a client device, a public key of a system server and locally seeding the public key in a secure storage at the client device. The method includes receiving a certificate list signed by a private key of the system server and verifying a source of the certificate list using the seeded public key. The method includes initiating a handshake process with a second device during which a digital device certificate of the second device is received. The method includes halting the handshake process and validating the second device by matching the digital device certificate with a certificate included on the verified certificate list. Based on the validation, the method includes managing a communication session with the second device to enable or prevent data transfer between the client device and the second device.

14 Claims, 6 Drawing Sheets

AUTOMATED VALIDATION OF DATA SOURCES IN A MANAGED NETWORK

FIELD

The embodiments described in this disclosure are related to systems and methods of client-server trust management and in particular to automated validation of data sources in managed networks.

BACKGROUND

In network communication, authentication of data sources relies on digital device certificates, which may also be referred to as public key infrastructure (PKI) device certificates. The digital device certificates may be used to authenticate an entity associated with a device and may provide a basis of encrypted or secured communication. For example, prior to communication between the device and the data source the data source may validate the entity associated with the data source, which may enable the device to trust the data communicated by the data source.

Validation of the data sources in managed networks may be overseen or supervised. For instance, some data sources or repositories may be verified by a management device or administrator. The verified data sources may be validated and trusted by the nodes of the managed networks, which may enable data communication between the data sources and the endpoints to perform operations.

In some managed networks, validation of data sources involves review of digital device certificates and/or public/private keys of the data sources. However, in the managed networks, communication of digital device certificates and/or the keys of the data sources introduces vulnerabilities and technical inefficiencies. For instance, distribution of keys may be intercepted, keys may be forged or copied, domain name service (DNS) might be hijacked, etc. Moreover, update and modification of verified data sources might involve multiple communications with endpoints, which are susceptible to vulnerabilities and resource intensive. Accordingly a need exists for technologies that automate validation of data sources in managed networks.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment includes a method of client-server trust management, which may include automated validation of data sources in a managed network. The method may include receiving, at a client device, a public key of a system server. The public key may be locally seeded in a secure storage at the client device. The method may include receiving a certificate list, which may be signed by a private key of the system server. A source of the certificate list may be verified using the seeded public key. The method may include initiating a communication session handshake process with a second device during which a digital device certificate of the second device is received by the client device. The method may include validating the second device by attempting to match the digital device certificate of the second device with one of the certificates included on the verified certificate list. Based on the validation, a communication session with the second device may be managed to enable or prevent data transfer between the client device and the second device.

Another aspect of an embodiment includes a method of client-server trust management. The method may include receiving, at a client device, a public key of a system server. The method may include locally seeding the public key in a secure storage at the client device. The seeding may occur when an agent is loaded on the client device. The method may include receiving a certificate list signed by a private key of the system server. The certificate list may include one or more trusted device certificates associated with devices that are trusted by the system server. The received certificate list may be cached at the client device for a particular period of time. The method may include verifying a source of the certificate list using the seeded public key. The method may include initiating a communication session handshake process between the client device and a second device. The communication session handshake process may include, for example, a transport layer security (TLS) handshake process or a secure sockets layer (SSL) handshake process. The initiating the handshake process may include directly accessing the second device using an internet protocol address of the second device without the DNS name of the second device. The method may include receiving a digital device certificate of the second device during the handshake process. The method may include halting the handshake process with the second device. During the halted handshake process, the method may include validating the second device using the digital device certificate of the second device based on the verified certificate list. Based on validation of the second device, the method may include managing a communication session with the second device to enable data transfer and operation performance by the client device. The validating may include matching the received digital device certificate with one of the trusted device certificates. Responsive to a successful match between the received digital device certificate and one of the trusted device certificates on the certificate list, the method may include identifying the second device as a trusted device, continuing the handshake process, communicating data with the second device related to the operation, and performing the operation. Additionally, responsive to a failure to match the received digital device certificate with the trusted device certificate on the certificate list, the method may include communicating to the system server a request for a current certificate list. The current certificate list may include one or more current trusted device certificates and may be signed by a private key of the system server. The method may include verifying, by the client, a signature on the current certificate list using the seeded public key. The method may include reattempting to match the received digital device certificate of the second device with one of the trusted device certificates on the current certificate list. Responsive to a successful match during the reattempt, the method may include identifying the second device as a trusted device, continuing the handshake process, communicating data with the second device related to the operation, and performing the operation. Responsive to a mismatch during the reattempt, the method may include identifying the second device as an untrusted device and discontinuing the handshake process. The reattempt may occur only once or may occur multiple times. The method may include receiving core data from the system server. The received core data may be signed by the private key of the system server. The core data may be validated using the seeded public key to ensure the data originates at the system server.

An additional aspect of an embodiment includes a non-transitory computer-readable medium having encoded therein programming code executable by one or more processors to perform or control performance of at least a portion of the methods described above.

Yet another aspect of an embodiment includes a computer device. The computer device may include one or more processors and one or more non-transitory computer-readable media. The non-transitory computer-readable media may have encoded therein programming code executable by the one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

The embodiments described in this disclosure are related to systems and methods of client-server trust management and in particular to automated validation of data sources and repositories in managed networks. Some embodiments leverage a public key locally seeded at endpoints during enrollment in the managed network. The certificate list may include digital device certificates (hereinafter, "certificate" or "certificates") of devices and entities trusted by for data transfer and communication in the managed network. The public key is used to verify certificate lists distributed by a system or management server. The client device may validate data sources or repositories by comparing a certificate communicated to the client device during a handshake process with certificates of the certificate list. Based on the comparison, the client device may validate the data source or repository.

The certificate lists enable updates to lists of trusted devices and entities and reduces computing overhead associated with management of the trusted devices. Additionally, seeding the public key reduces communications in the managed network and reduces vulnerabilities introduced during these communications.

For example, in some example embodiments, a client device receives a public key of a system server during an agent-loading operation, which may be included in an enrollment process for a managed network. The public key is locally seeding in a secure storage at the client device. A certificate list, which is signed by a private key of the system server, is then communicated to the client device and verified using the seeded public key. A communication session handshake process is initiated with a second device during which a digital device certificate of the second device is received. The client device validates the second device by attempting to match the digital device certificate with one of the certificates included on the verified certificate list. Based on the validation, a communication session is managed with the second device to enable or prevent data transfer and subsequent performance of operations by the client device.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
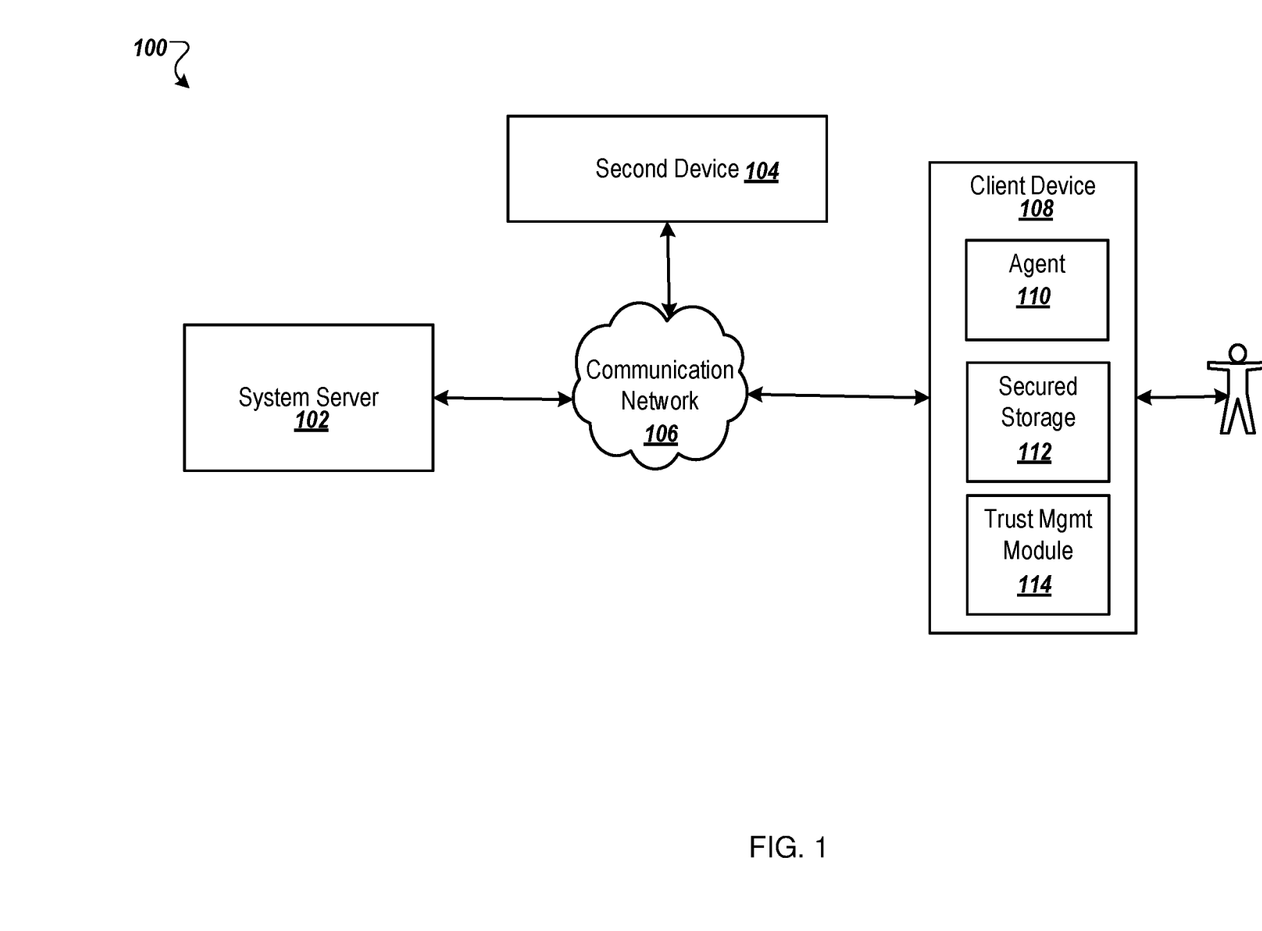
FIG. 1 depicts a block diagram of an example operating environment in which some embodiments described in the present disclosure may be implemented.

FIG. 1 illustrates an example operating environment 100 in which some embodiments described in the present disclosure may be implemented. The operating environment 100, a system server 102 may be implemented to manage a network of nodes including the client device 108. An aspect of management of the client device 108 includes ensuring that the client device 108 can verify and trust a second device 104 and the system server 102. Verification and trust of the second device 104 and the system server 102 may be a prerequisite to communication sensitive data such as core data.

In some conventional systems, certificate chains or certificate pinning may be implemented for verification of the system server 102 and/or the second device 104. However, the certificate chains and conventional certificate pinning suffer from some technical and security shortcomings. For instance, in conventional certificate pinning, a verification process only responds to one specific certificate. However, if that one specific certificate is changed at the system server 102, then the client device 108 must be manually updated with the changed certificate to trust. Accordingly, the conventional certificate pinning introduces technical inefficiency when a relied upon certificate changes. This shortcoming is particularly harmful in managed networks with hundreds or thousands of managed nodes. Similarly, in conventional certificate chains, the chain is signed by a root authority (e.g., the system server 102) that is trusted by the client device 108. Acquisition and distribution of third party trusted certificates involves significant expense and requires expertise to ensure the trusted certificates exist at the client device 108 and other nodes. More particularly, a trusted root certificate may be installed on the client device 108 relatively easily. However, verification by the client device 108 that all trusted root certificates are actually trusted is significantly more difficult. Thus, a root certificate that appears to be a valid may be used to validate the identity of an end node that is actually not trusted.

Additionally, conventional certificate pinning and certificate chains may not allow for connections between the second device 104 and the client device 108 if there is a name mismatch (e.g., a name mismatch between a certificate and a name associated with the second device 104). An ability to connect due to the name mismatch also prevents secure connections using an internet protocol (IP) address only. Moreover, a certificates expire and/or are revoked, substantial efforts are expended in conventional systems to ensure updated or new certificates are obtained and distributed. Additionally still, the conventional certificate pinning and certificate chains introduce a footprint for an attack. For instance, an attacker or malicious actor might inject a root certificate into a secured storage 112 in which root certificates are stored or gain access over a certificate in the certificate chain.

Embodiments described in the present disclosure improve these conventional systems and address the technical shortcomings in these conventional systems. For instance, some embodiments modify conventional certificate pinning to enable automatic and secure updates and changes. Additionally, instead of the client device 108 trusting a third-party certificate chain, some embodiments securely distribute a set of specific public certificates that are trusted for an operation. For example, some embodiments seed a public key of the system server 102 at the client device 108. The system server 102 may then maintain and distribute a certificate list to the client device 108. The client device 108 may periodically request the certificate lists from the system server 102, which is signed by a private key of the system server 102. The client device 108 may verify a source of the certificate list using the seeded public key of the system server 102.

The client device 108 may then initiate a handshake process with the second device 104. During an initial exchange of the handshake process, the client device 108 may determine whether that a certificate exchanged during the initial exchange is on the verified certificate list. If so, the client device 108 has verified that the second device 104 is a trusted device. The client device 108 may continue the handshake process with the second device 104 and ultimately exchange data related to an operation performed by the client device 108. If the certificate of the second device 104 is not on the certificate list, the client device 108 may request an updated certificate list from the system server 102 or discontinue the handshake process.

Some advantages of embodiments described in the present disclosure include enabling verification and secure communication using an IP address of the second device 104, without relying on names on certificates and names associated with the second device 104. Additionally, some embodiments may improve distribution when a certificate expires or a certificate is revoked. Additionally still, some embodiments reduce a footprint for a certificate injection attack or man-in-the middle attack and reduces the ability to access a certificate in the certificate chain. Furthermore, management by the system server 102 is improved. For instance, third-party certificates do not need to be acquired or purchased and installed on the second device 104 and reduces the need to update root stores on the client device 108.

As introduced above, the operating environment 100 may include the client device 108, the system server 102, and the second device 104 that are configured to communicate data and information via a communication network 106. In the following paragraphs, some additional details of these components (102, 104, 106, and 108) are provided.

The communication network 106 may include any communication network configured for communication of signals between the components (e.g., 102, 104, and 108) of the operating environment 100. The communication network 106 may be wired or wireless. The communication network 106 may have configurations including a star configuration, a token ring configuration, or another suitable configuration. Furthermore, the communication network 106 may include a local area network (LAN), a wide area network (WAN) (e.g., the Internet), and/or other interconnected data paths across which multiple devices may communicate. In some embodiments, the communication network 106 may include a peer-to-peer network. The communication network 106 may also be coupled to or include portions of a telecommunications network that may enable communication of data in a variety of different communication protocols.

In some embodiments, the communication network 106 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the communication network 106 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The second device 104 may include a hardware-based computer system that may be communicatively connected to the client device 108 and the system server 102 via the communication network 106. In the depicted embodiment, the second device 104 may be a third-party device or a device that is not trusted by the client device 108. For instance, in some embodiments, the second device 104 may be external to a network of nodes, which includes the client device 108, that is managed by the system server 102. In some embodiments, the second device 104 may be managed by the system server 102. For instance, the client device 108 may be included in an enterprise network. The system server 102 may be implemented to manage the enterprise network. The second device 104 may be a storage device of the enterprise and included in the enterprise network as well.

The second device 104 is configured to communicate data with the client device 108 to perform an operation. The operation might include accessing core data or secure data and performing a local operation using the data. For instance, the second device 104 may store enterprise data that is sensitive such as internal accounting documents, software code, contractual information, internal email systems, and the like. The operation may include accessing the data, viewing the data, displaying the data, copying the data, modifying the data, other operations, or combinations thereof.

The second device 104 may have a certificate. The certificate of the second device 104 and other devices described herein are used to uniquely identify the second device 104, an entity associated with the second device, provide encryption services, or combinations thereof. In some instances, the certificate may be used in authentication of the second device 104 and key generation and exchange at the second device 104. The certificate may be signed by a certificate authority.

The system server 102 may include a hardware-based computer system that may be communicatively connected to the client device 108 and the second device 104 via the communication network 106. The system server 102 of FIG.

1 is depicted as a single device. In some embodiments, the system server 102 may include a virtual device or a combination of two or more portions of two or more devices configured to perform operations described in this disclosure.

The system server 102 is configured to manage a managed network of nodes that includes the client device 108 and may include the second device 104. The system server 102 of FIG. 1 includes an endpoint management module ("EPM module") 118. The EPM module 118 may be configured to discover the client device 108 and manage the client device 108. Some examples of management services provided by the EPM module might include establishing and maintaining security settings at the client device 108, pushing application patches and updates to the client device 108, determining which applications are loaded on the client device 108, monitoring activity of the client device 108, other management devices and the like.

In some embodiments, the EPM module 118 may load an agent 110 to the client device 108. The agent 110 may be configured to communicate data and information with the EPM module 118 that is used in the management of the client device 108. The agent 110 may have access to software and hardware components of the client device 108, which may enable real time access to data and information at the client device 108. Loading the agent 110 to the client device 108 may be referred to as device enrollment. The device enrollment may include the client device 108 following a set of links to the system server 102, which triggers the download of the agent 110. Additionally or alternatively, the agent 110 may be preloaded onto the client device 108 by an administrator prior to being provided to a user 109.

In some embodiments, the system server 102 may provide its public key to the client device 108. The public key may be provided to the client device 108 with the agent 110 or substantially concurrently with the agent 110. The public key of the system server 102 may be cached at a secured storage 112, which may be in the client device 108 (as depicted in FIG. 1) or may be remote to the client device 108. Throughout this disclosure, provision of the public key to the client device 108 is referred to as seeding the public key.

The system server 102 may include a certificate management module 116 (in FIG. 1, "certificate mgmt. module"). The certificate management module 116 may be configured to collect the certificate of the second device 104 along with certificates of other devices. The certificate management module 116 may generate certificate lists, which may include one or more certificates of devices such as the second device 104 that are trusted to participate in an operation. For instance, the second device 104 may host email data for an enterprise. Accordingly, a certificate list for an email operation might include the certificate of the second device 104.

Additionally, the certificate management module 116 may update and change the certificate list. For instance, the certificate list including the second device 104 may be revoked or modified. Accordingly, the certificate list including the certificate of the second device 104 may be modified to remove the revoked certificate.

The certificate management module 116 may sign the certificate list with its private key. The private key used in the signature corresponds to the public key communicated with the agent 110. The certificate list may then be communicated to the client device 108. The signature enables the client device 108 to verify the origin of the certificate list using the seeded public key of the system server 102. Verification by the client device 108 using the signature on the certificate list ensures that the client device 108 knows that the certificate list originates at the system server 102. The received certificate list may be cached locally at the client device 108. For instance, the certificate list may be locally stored at the secured storage 112.

The client device 108 may include a hardware-based computer system that may be communicatively connected to the system server 102 and the second device 104 via the communication network 106. Some examples of the client device 108 may include a smart phone, a laptop computer, a desktop computer, a printer, a scanner device, a network appliance, etc.

In general, to communicate data and information with the second device 104 or the system server 102, the client device 108 and the second device 104 might establish a secured communication session. The secured communication session enables authentication and verification of the devices involved in the exchange of communication. For example, a transport layer security (TLS) session or a secure sockets layer (SSL) session may be established between the client device 108 and the second device 104. The client device 108 may include a trust management module 114 (in the Figures, "trust mgmt. module 114"). The trust management module 114 may be configured to verify and authenticate devices using the certificate lists prior to operation performance such as during a handshake process.

In some embodiments, the trust management module 114 may initiate a communication session handshake process between the client device 108 and the second device 104. In some embodiments, the initiating the handshake process includes directly accessing the second device 104 using the IP address of the second device 104 without the DNS name of the second device 104.

During the handshake process, the trust management module 114 may receive the certificate from the second device 104. The trust management module 114 may validate the second device 104. For instance, the trust management module 114 may attempt to match the received certificate from the second device 104 with a trusted certificate on a local certificate list received by the client device 108.

Responsive to a match, the trust management module 114 identifies the second device 104 as a trusted device. The trust management module 114 may continue the handshake process to establish the secured session and communicate data with the second device 104 related to the operation.

In some embodiments, responsive to a mismatch or a failure to match, the trust management module 114 may communicate to the system server 102 a request for a current or an updated certificate list. The current or updated certificate list includes certificates of the trusted devices and is signed by the private key of the system server 102. The trust management module 114 may validate the current certificate list. After the current certificate list is validated, the trust management module 114 caches it. The trust management module 114 may then re-attempt to match the received certificate from the second device 104 to the trusted certificates of the current certificate list. Responsive to the reattempted validation being successful, the trust management module 114 may continue the handshake process with the second device 104 and exchange data with the second device 104 to conduct the operation. Responsive to the reattempted validation not being successful, the client device 108 may identify the second device 104 as an untrusted device and discontinue the handshake process. In the above example, one reattempt is allowed prior to discontinuing the handshake process. In some embodiments no reattempts are allowed and in other embodiments more than one reattempt (e.g., two or three reattempts) may be allowed before the handshake process is discontinued.

In some embodiments, the local certificate list is cached for a particular period of time such as twelve hours, twenty-four hours, forty-eight hours, or another suitable period of time. In these and other embodiments, the local certificate list may be deleted and a request for a current certificate list may be communicated. Additionally or alternatively, the trust management module 114 may assess whether the local certificate list has not been cached longer than the particular period of time. Responsive to the local certificate list being cached for longer, the trust management module 114 may request the current certificate list before attempting to validate the certificate of the second device 104.

The secured communication session may be established without the DNS name being verified. For instance, as described above, the client device 108 may directly access the second device 104 using the IP address of the second device 104. The client device 108 may then determine that the second device 104 is trusted using the certificate list instead of a DNS name verification process.

Additionally, core data may be directly communicated from the system server 102. The system server 102 may sign the core data with its private key. The client device 108 may validate the core data with the seeded public key.

The agent 110, the trust management module 114, the certificate management module 116, the EMP module 118 (collectively, modules), and components thereof may be implemented using hardware including a processor, a microprocessor (e.g., to perform or control performance of one or more operations), a field-programmable gate array (FPGA), or an application-specific integrated circuit (ASIC). In some other instances, the modules and components thereof may be implemented using a combination of hardware and software. Implementation in software may include rapid activation and deactivation of one or more transistors or transistor elements such as may be included in hardware of a computing system (e.g., the client device 108, the system server 102, or the second device 104 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more client devices 108, one or more system servers 102, one or more second devices 104, one or more communication networks 106, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
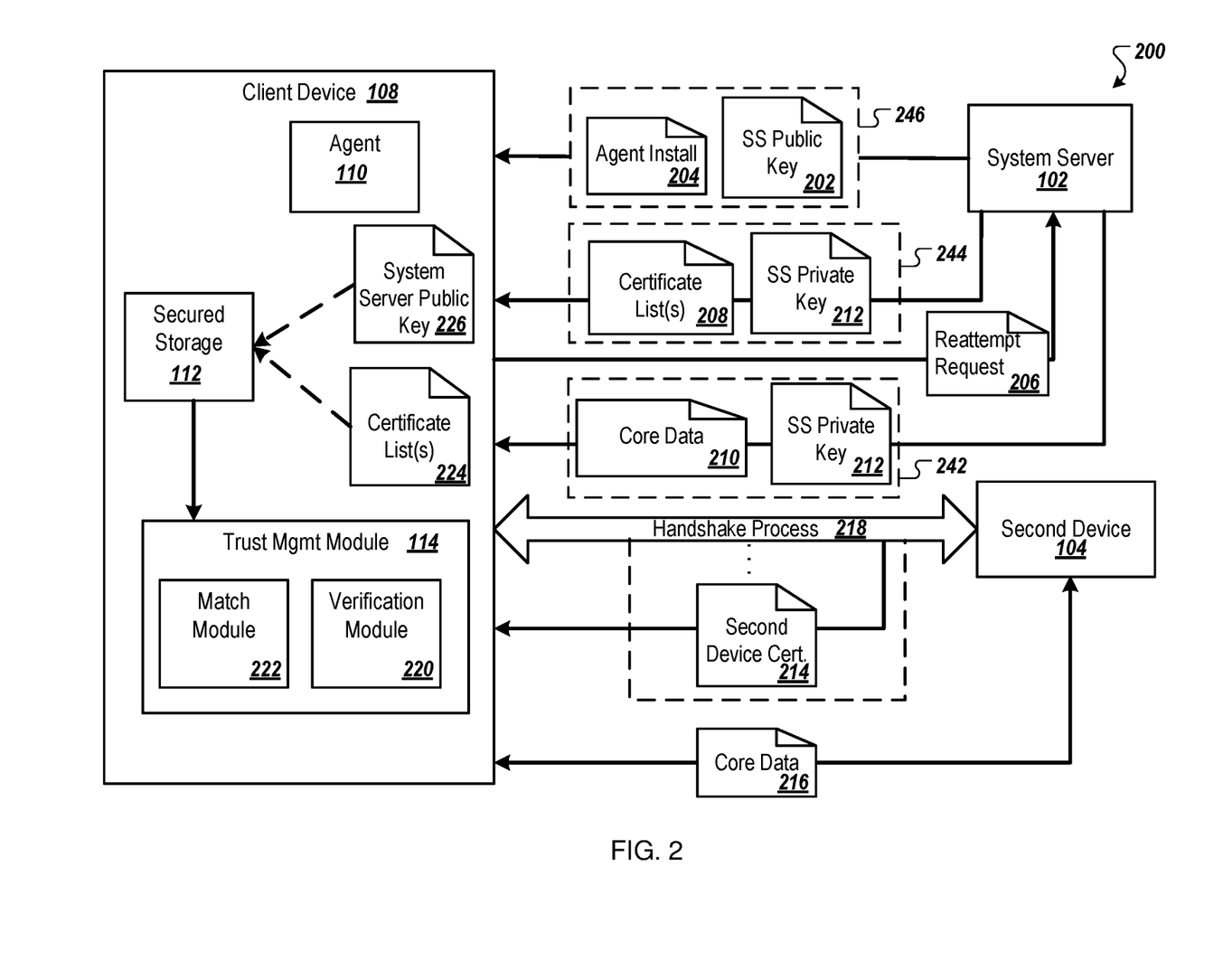
FIG. 2 is a block diagram of an example automated validation process (validation process) that may be implemented in the operating environment of FIG. 1.

FIG. 2 illustrates an automated validation process (validation process) 200 that may be implemented in the operating environment 100 of FIG. 1 or another suitable environment. FIG. 2 includes some components (e.g., 108, 104, 102, etc.) described in FIG. 1. Descriptions of these components are not repeated with reference to FIG. 2. Additionally, the communication network 106 is omitted from FIG. 2. It may be understood with the benefit of this disclosure that communication of data and information included in the validation process 200 may occur via the communication network 106 or another suitable network.

In the validation process 200 of FIG. 2, the system server 102, a component thereof (e.g., the EPM module 118 of FIG. 1), or another system may communicate a first data package 246 to the client device 108. The first data package 246 may include an agent for installation and a system server public key 202 (in FIG. 2, "agent installation" and "SS public key"). The agent for installation 204 may include the agent 110 and an installation executable that when implemented at the client device 108 installs the agent 110. The public key 202 may be a cryptographic key generated using a key generation algorithm. The public key 202 may correspond to a private key 212 described below.

The public key 202 may be received by the client device 108. The public key 202 may be locally seeded at the client device 108. For instance, the public key 202 may be locally seeded at the secured storage 112. The secured storage 112 may include a portion of local non-transitory memory in some embodiments. In some embodiments, the secure storage 223 may be securely accessed by the client device 108. In some embodiments, seeding the public key 202 may occur when the agent 110 is loaded on the client device 108. In some embodiments, the public key 202 may be seeded separately from loading the agent 110.

By seeding the public key at the client device 108 during an agent-loading process, the client device 108 may have key that is stored locally and that is trusted. This limits future and potentially untrusted communications from the system server 102. For instance, in some conventional communications, the system server 102 might later communicate a public key followed by a certificate list. However, these later communications are vulnerable to man-in-the-middle attacks. Thus, seeding the public key removes or reduces this vulnerability of later communication of the public key. Moreover, in systems in which there are hundreds or thousands of client devices 108, seeding the public key 202 during the agent 110 install removes or reduces the need to communicate the public key 202 later as the certificate lists 208 are distributed.

The system server 102 or some component thereof (e.g., the certificate management module 116) may communicate a certificate list package 244. The certificate list package 244 may include a certificate list 208, which is signed by a private key of the system server 102 (in FIG. 2, "SS private key"). The private key 212 corresponds to the public key 202 that is seeded at the client device 108.

The certificate list 208 may include a list or collection of trusted device certificates. The trusted certificates of the certificate list 208 may pertain to one or more particular operations that are performed by the client device 108. For instance the trusted device certificates may include the certificates of one or more devices (e.g., the second device 104) that the system server 102 has validated as a trusted party that may exchange information with the client device 108 to perform a particular operation.

The client device 108 may receive the certificate list package 244. The client device 108 may then validate a source of the certificate list 208 using the seeded public key 226. In the depicted embodiment, the signature of the certificate list 208 is the private key 212 of the system server 102. The private key 212 may be verified using the seeded public key 226, which indicates that the system server 102 signed the certificate list 208.

The client device 108 may then cache the certificate list 224. For instance, the client device 108 may cache the certificate list 224 locally at the client device 108. The certificate list 224 may be cached at the secured storage 112 or another suitable portion of memory that is accessible to the trust management module 114.

In some embodiments, the certificate list 224 is cached for a predetermined or particular period of time such as twelve hours, twenty-four hours, or another suitable period of time. In these and other embodiments, the certificate list 208 or the certificate list package 244 may include a timestamp or the trust management module 114 may record a time when the certificate list 224 is received. Following the particular period of time, the trust management module 114 may stop using the cached certificate lists 224. In some embodiments, the trust management module 114 might request an updated certificate list package 244 with an updated certificate list 208.

Two or more certificate list packages 244 may be communicated to the client device 108. For instance, in some embodiments the system server 102 may communicate the certificate list packages 244 according to a schedule such as every twelve hours, twenty-four hours, forty-eight hours, etc. The schedule may correspond to a period of time the certificate list(s) 224 are cached at the client device 108. Additionally or alternatively, the system server 102 may communicate a subsequent certificate list package 244 that includes a current certificate list 208 signed the private key 212 of the system server 102. The current certificate list 208 may include an updated or new list or collection of certificates of trusted devices. For instance, responsive to certificate revocation of the second device 104 or addition of another device, etc. a current or updated certificate list 208 may be communicated to the client device 108. The current certificate list may be verified at the client device 108 using the seeded public key 226 of the system server 102 as described above.

To initiate an operation by the client device 108, a communication session handshake process (handshake process) 218 may be initiated. For instance, the handshake process 218 may be initiated between the client device 108 and the second device 104 in circumstances in which the operation involves data 216 stored or otherwise managed by the second device 104.

In some embodiments, the initiating the handshake process 218 may include directly accessing the second device 104 using an IP address of the second device 104. For instance, the handshake process 218 may be initiated without using the DNS name of the second device 104. The handshake process 218 may include a transport layer security (TLS) handshake process, a secure sockets layer (SSL) handshake process, combinations thereof or another suitable handshake process.

During the handshake process 218, a certificate of the second device 104 (in FIG. 2, "second device cert.") may be communicated by the second device 104 to the client device 108. For instance, the handshake process 218 may include a TLS handshake process. The TLS handshake process may be initiated to establish a communication session using TLS encryption. One of the steps of the TLS handshake process (e.g., following a determination of the version of TLS to use and cipher suites) is the identity authentication of the second device 104 using a public key and a SSL certificate of the second device 104.

After the certificate of the second device 104 is received, the handshake process may be halted. For instance, the certificate may be communicated early in the TLS or SSL handshake process or prior to communication of substantive information between the client device 108 and the second device 104. The handshake process may be halted until the second device 104 is validated as described below.

A match module 222 of the trust management module 114 may validate the second device 104. In some embodiments, validation of the second device 104 may include matching the received certificate of the second device 104 with one of the trusted certificates on the locally cached certificate list 224. For instance, the match module 222 may determine whether the received certificate 214 matches one of the trusted certificates on the certificate list 224. Responsive to the received certificate 214 matching one of the trusted certificates on the certificate list 224, a verification module 220 may identify the second device 104 as a trusted device. The handshake process 218 may be continued with the second device 104. The data 216 related to the operation may be communicated between the client device 108 and the second device 104 using a communication channel established during the handshake process 218. The client device 108 may then perform the operation using the data 216 communicated with the second device 104.

Responsive to the received certificate 214 not matching one of the trusted certificates of the certificate list 224, the verification module 220 may communicate a reattempt request 206 to the system server 102. The reattempt request 206 may request for a current certificate list (e.g., 208). The system server 102 may communicate a subsequent certificate list package 244 that includes a current certificate list 208 signed the private key 212 of the system server 102. The current certificate list 208 may include an updated or new list or collection of certificates of trusted devices. The current certificate list may be verified at the client device 108 using the seeded public key 226 of the system server 102 as described above.

The match module 222 may attempt to match the received certificate of the second device 104 (e.g., during the handshake process 218) with one of the trusted certificate on the current certificate list. Responsive to a successful match the verification may identify the second device 104 as a trusted device, continue with the handshake process 218, and communicate the data 216. Alternatively, in response to the received certificate of the second device 104 not matching the trusted certificates of the current certificate list 224, the verification module 220 may either communicate a second reattempt request 206 and repeat the process above, or may identify the second device 104 as an untrusted device, which may indicate that data communication with the second device 104 introduces a potential vulnerability to the client device 108 and/or a managed network. In some embodiments, after the second device 104 is identified as untrusted, the verification module 220 may discontinue the handshake process 218. Accordingly, data related to an operation may not be communicated because no communication channel is established between the client device 108 and the second device 104.

In some embodiments, the match module 222 may include a reattempt limit. The reattempt limit dictates whether the reattempt request 206 is sent or the second device 104 is identified as untrusted. For instance, in some embodiments, one reattempt may be the limit. In other embodiments, the limit may be greater than one reattempt such as two or three reattempts. Responsive to the reattempt limit not being reached the reattempt request 206 may be sent. Responsive to the reattempt limit being reached, the second device 104 may be identified as an untrusted device.

In some embodiments, a core data package 242 may be communicated from the system server 102 to the client device 108. The core data package 242 may be received by the client device 108. The core data package 242 may include core data 210, which is signed by the system server private key 212. The core data 210 may include enterprise data in some instances or may be other private or confidential data. The received core data package 242 may be validated at the client device 108. For instance, the core data 210 may be validated using the seeded public key 226 to ensure the core data 210 originates at the system server 102.

Figure 3:
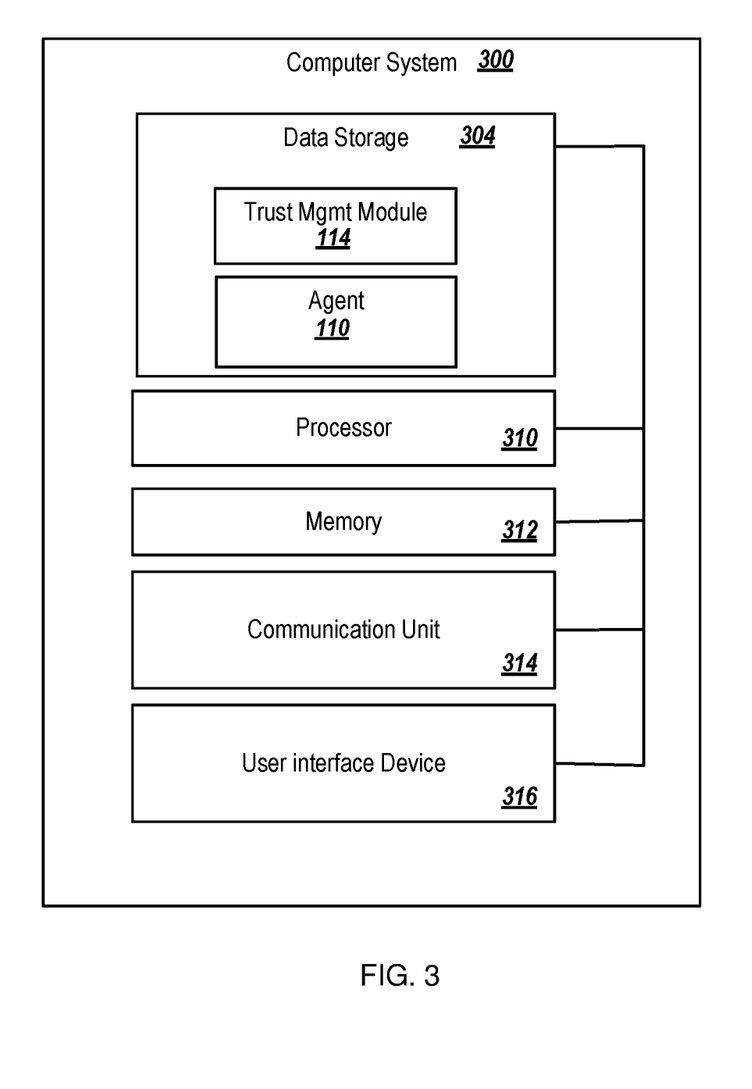
FIG. 3 illustrates an example computer system configured for client-server trust management and/or the automated validation process of FIG. 2.

FIG. 3 illustrates an example computer system 300 configured for client-server trust management, according to at least one embodiment of the present disclosure. The computer system 300 may be implemented in the operating environment 100 of FIG. 1, for instance. Examples of the computer system 300 may include the client device 108, the second device 104, the system server 102, or some combination thereof. The computer system 300 may include one or more processors 310, a memory 312, a communication unit 314, a user interface device 316, and a data storage 304 that includes the trust management module 114, the agent 110, the certificate management module 116, and the EPM module 118 (collectively, modules 311).

The processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 3, the processor 310 may more generally include two or more processors configured to perform individually or collectively any number of operations described in the present disclosure. Additionally, one or more of the processors 310 may be present on one or more different electronic devices or computing systems. In some embodiments, the processor 310 may interpret and/or execute program instructions and/or process data stored in the memory 312, the data storage 304, or the memory 312 and the data storage 304. In some embodiments, the processor 310 may fetch program instructions from the data storage 304 and load the program instructions in the memory 312. After the program instructions are loaded into the memory 312, the processor 310 may execute the program instructions.

The memory 312 and the data storage 304 may include computer-readable storage media for carrying or having computer-executable instructions or data structures stored thereon. Such computer-readable storage media may include any available media that may be accessed by a general-purpose or special-purpose computer, such as the processor 310. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations.

The communication unit 314 may include one or more pieces of hardware configured to receive and send communications. In some embodiments, the communication unit 314 may include one or more of an antenna, a wired port, and modulation/demodulation hardware, among other communication hardware devices. In particular, the communication unit 314 may be configured to receive a communication from outside the computer system 300 and to present the communication to the processor 310 or to send a communication from the processor 310 to another device or network (e.g., the network 126 of FIG. 1).

The user interface device 316 may include one or more pieces of hardware configured to receive input from and/or provide output to a user. In some embodiments, the user interface device 316 may include one or more of a speaker, a microphone, a display, a keyboard, a touch screen, or a holographic projection, among other hardware devices.

The modules 311 may include program instructions stored in the data storage 304. The processor 310 may be configured to load the modules 311 into the memory 312 and execute the modules 311. Alternatively, the processor 310 may execute the modules 311 line-by-line from the data storage 304 without loading them into the memory 312. When executing the modules 311, the processor 310 may be configured to perform one or more processes or operations described elsewhere in this disclosure.

Modifications, additions, or omissions may be made to the computer system 300 without departing from the scope of the present disclosure. For example, in some embodiments, the computer system 300 may not include the user interface device 316. In some embodiments, the different components of the computer system 300 may be physically separate and may be communicatively coupled via any suitable mechanism. For example, the data storage 304 may be part of a storage device that is separate from a device, which includes the processor 310, the memory 312, and the communication unit 314, that is communicatively coupled to the storage device. The embodiments described herein may include the use of a special-purpose or general-purpose computer including various computer hardware or software modules, as discussed in greater detail below.

Figure 4A:
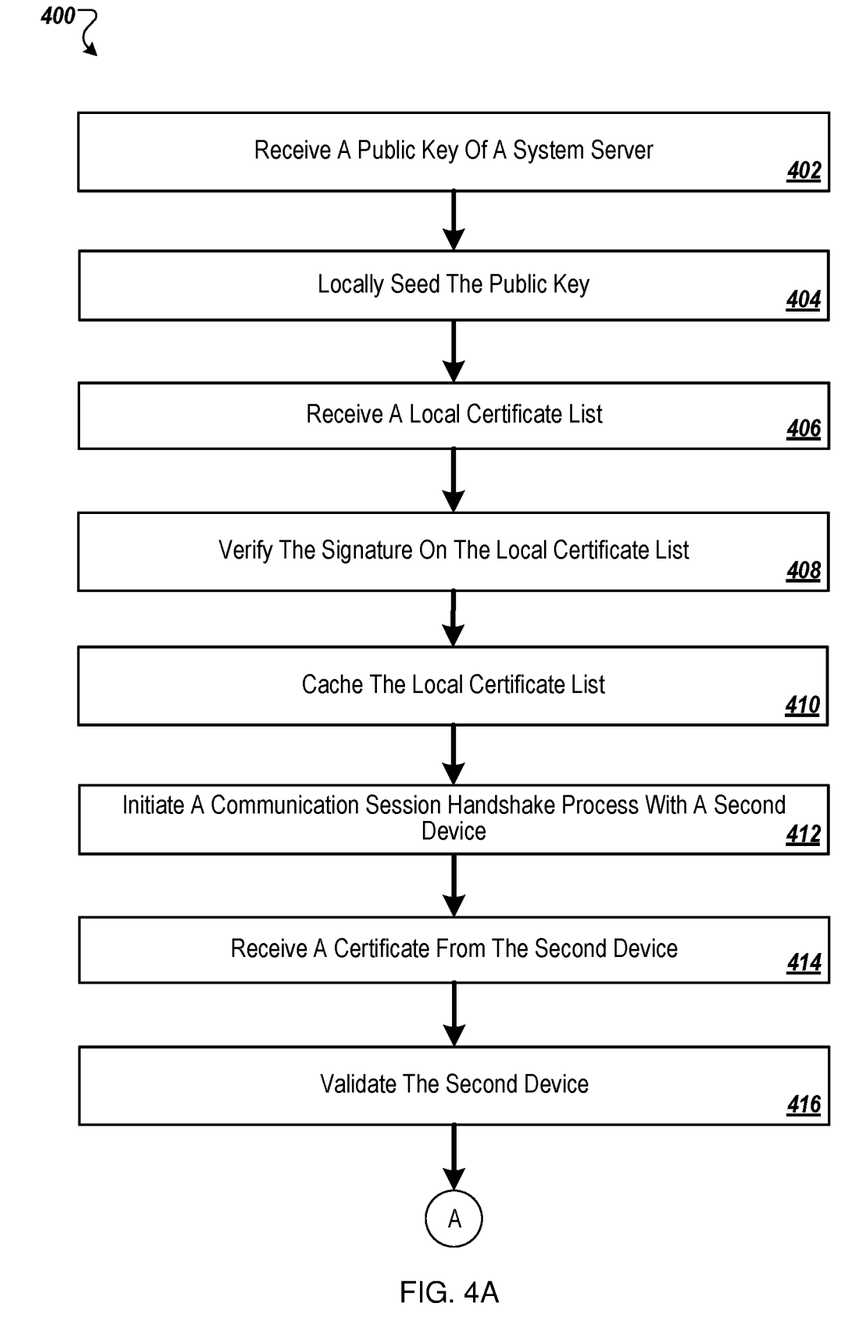
FIGS. 4A-4C depict a flowchart of an example method of automated validation and update of trusted sources, all according to at least one embodiment described in the present disclosure.
Figure 4B:
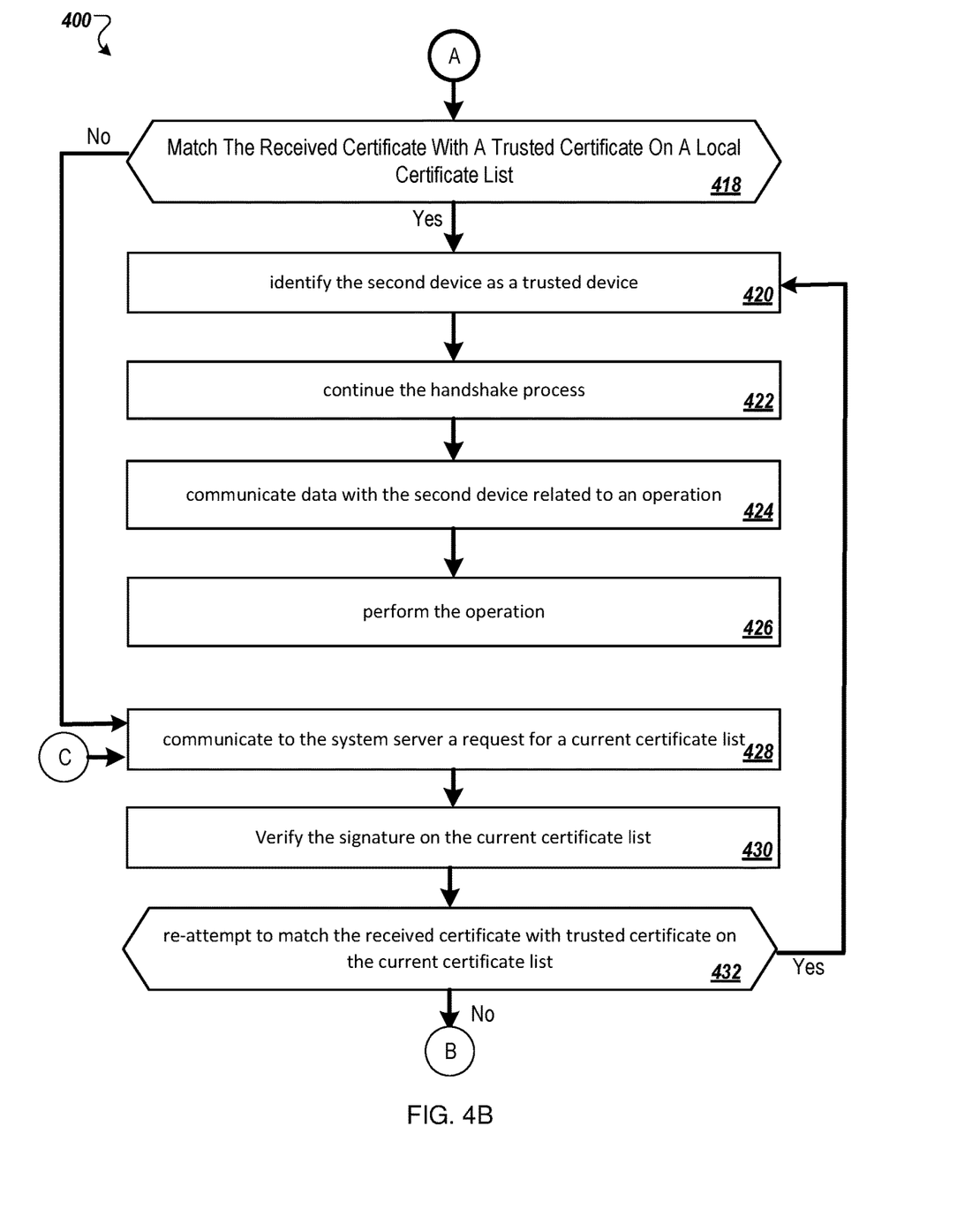
Figure 4C:
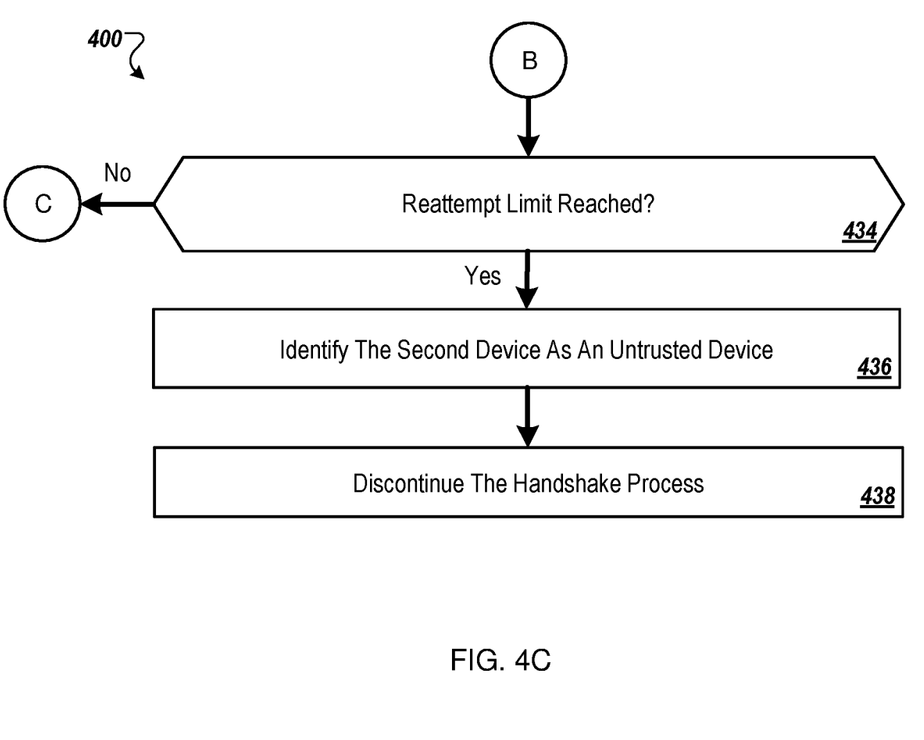

FIGS. 4A-4C are a flowchart of an example method 400 of automated validation and update of trusted sources according to at least one embodiment of the present disclosure. The method 400 may be performed in a suitable operating environment such as the operating environment 100. The method 400 may be performed by the client device 108 or the system server 102 described elsewhere in the present disclosure or by another suitable computing system, such as the computing system 300 of FIG. 3. The client device 108 or the system server 102 implementing or controlling operation of the method 400 may be included in a cloud-based networked system, a managed network, managed subnetwork, or another suitable network computing environment. Although illustrated as discrete blocks, one or more blocks in FIGS. 4A-4C may be divided into additional blocks, combined into fewer blocks, or eliminated, depending on the desired implementation.

Referring to FIG. 4A, the method 400 may begin at block 402, in which a public key may be received. For instance, the public key of a system server may be received at a client device. In these and other embodiments, the system server or another device may communicate its public key to the client device. In some embodiments, the public key may be communicated with or otherwise associated with an agent that is downloaded by the client device. For example, when the agent is loaded on the client device (e.g., downloaded or otherwise accessed), the public key may be communicated along with the agent to the client device.

At block 404, the public key may be locally seeded. For instance, the public key may be locally seeded at a secure storage. The secure storage may be on the client device (e.g., a portion of local non-transitory memory) or the secure storage that may be securely accessed by the client device. In some embodiments, seeding the public key may occur when the agent is loaded on the client device. In other embodiments, the public key may be seeded separately from loading the agent.

At block 406, a certificate list may be received. The certificate list may be received from the system server, for instance. The certificate list may be signed by the private key of the system server. The certificate list may include a list or collection of trusted device certificates of one or more trusted devices. For instance the trusted device certificates may include the certificates of one or more devices that the system server has validated as a trusted party or being associated with a trusted entity that may exchange information with devices in a managed network.

At block 408, a signature of the certificate list may be verified. For instance, the client device may use the seeded public key of the system server to verify the signature. Responsive to the certificate list being verified, the client device can trust the certificate list as originating or being communicated by the system server. Responsive to the certificate list not being verified, the certificate list may be disregarded.

At block 410, the certificate list may be cached. For instance, the client device may cache the certificate list at the client device. In some embodiments, the certificate list is cached for a predetermined or particular period of time such as twelve hours, twenty-four hours, or another suitable period of time.

At block 412, a communication session handshake process may be initiated. For instance, the handshake process may be initiated between the client device and a second device. In some embodiments, the initiating the handshake process may include directly accessing the second device using an internet protocol address of the second device without the domain name system (DNS) name of the second device. The communication session handshake process may include a transport layer security (TLS) handshake process, a secure sockets layer (SSL) handshake process, combinations thereof or another suitable handshake process.

At block 414, a certificate may be received. For instance, during the handshake process, a certificate may be received from the second device at the client device. At block 415, the handshake process may be halted. For instance, the certificate may be communicated early in the handshake process (e.g., as an initial authentication exchange and prior to communication of substantive information). The handshake process may be halted until the second device is validated. At block 416, the second device may be validated. For instance, the client device may validate the second device. In some embodiments, validation of the second device may include matching the received certificate of the second device with one of the trusted device certificates on the received certificate list, which is shown in FIG. 4B as block 418.

Referring to FIG. 4B, at block 418 it may be determined whether the received certificate matches one of the trusted device certificates on the certificate list. Responsive to the received certificate matching one of the trusted device certificates ("YES" at block 418), the method 400 may proceed to block 420. Responsive to the received certificate not matching one of the trusted device certificates ("NO" at block 418), the method 400 may proceed to block 434 of FIG. 4C.

At block 420, the second device may be identified as a trusted device. For instance, the client device may identify the second device as a trusted device. At block 422, the handshake process may be continued. For instance, the client device may continue the handshake process with the second device. At block 424, data related to an operation may be communicated. For instance, the client device and the second device may communicate the data related to the operation following the handshake process and using a communication channel established during the handshake process. At block 426, the operation may be performed. For instance, the operation may be performed using the data communicated with the second device.

Referring to FIG. 4C, at block 434 it may be determined whether a reattempt limit is reached. For instance, in some embodiments, one reattempt may be the reattempt limit. In other embodiments, the reattempt limit may be zero, or may be greater than one reattempt such as two or three reattempts. Responsive to the reattempt limit not being reached ("NO" at block 434), the method 400 may proceed to block 428 of FIG. 4B. Responsive to the reattempt limit being reached ("YES" at block 434), the method 400 may proceed to block 436.

At block 436, the second device may be identified as an untrusted device. For instance, the client device may identify the second device as an untrusted device, which may indicate that data communication with the second device introduces a potential vulnerability. At block 438, the handshake process may be discontinued. For instance, the client device may discontinue the handshake process with the second device. Accordingly, data related to an operation may not be communicated because no communication channel is established between the client device and the second device. In some embodiments, the reattempt limit may be zero. Accordingly, in these and other embodiments, one failure to match the certificate with one of the trusted device certificates of the certificate list may result in a discontinuation of the handshake process. In some embodiments, the reattempt limit may be one. Accordingly, in these and other embodiments, the method 400 may proceed to block 428.

At block 428, a request for a current or updated certificate list may be communicated. For instance, the client device may communicate the request to the system server. The current certificate list may include an updated, a new list, or new collection of certificates of trusted devices. The current certificate list may be signed the private key of the system server. At block 430, the signature on the current certificate list may be verified. As described with reference to block 408, the signature on the current certificate list may be verified using the seeded public key. At block 432, a match between the received certificate and one of the trusted device certificate on the current certificate list may be re-attempted. Responsive to a successful match ("YES" at block 432), the method 400 may proceed to block 420, which is described above. From block 420, the method 400 may proceed through blocks 422, 424, 426, or some combination thereof.

Responsive to a failed match ("NO" at block 432), the method may proceed to block back to block 434 of FIG. 4C in which the reattempt limit is evaluated. From block 434, the method 400 may proceed through block 428 and blocks 430, 432, 420, 422, 424, 426, 434, 436, 438, or some combination thereof depending at least in part on the reattempt limit.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments. For example, in some embodiments, the method 400 may include receiving core data from the system server. The received core data may be signed by the private key of the system server. The received core data may be validated. For instance, the core data may be validated using the seeded public key to ensure the core data originates at the system server.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the embodiments and the concepts contributed to furthering the art and are to be construed as being without limitation to such specifically recited examples and conditions. Although embodiments have been described in detail, various changes, substitutions, and alterations could be made hereto without departing from the scope of the embodiments.

What is claimed is:

1. A method of client-server trust management, the method comprising:
   receiving, at a client device, a public key of a system server;
   locally seeding the public key in a secure storage at the client device, wherein the seeding occurs when an agent is loaded on the client device;
   receiving a certificate list signed by a private key of the system server, the certificate list including one or more trusted device certificates associated with devices that are trusted by the system server;
   verifying a source of the certificate list using the seeded public key;
   initiating a communication session handshake process between the client device and a second device;
   receiving during the handshake process, a digital device certificate of the second device;
   halting the handshake process with the second device;
   during the halted handshake process, validating the second device using the digital device certificate of the second device based on the received certificate list having the verified source, the validating including:
      matching the received digital device certificate with one of the one or more trusted device certificates;
      responsive to a failure to match the received digital device certificate with the one or more trusted device certificates on the certificate list:
         communicating to the system server a request for a current certificate list, wherein the current certificate list includes one or more current trusted device certificates, and wherein the current certificate list is signed by the private key of the system server;
         verifying, by the client device, a signature on the current certificate list using the seeded public key; and
         reattempting to match the received digital device certificate of the second device with one of the one or more current trusted device certificates on the current certificate list; and
   based on the validating of the second device, managing a communication session with the second device to enable data transfer and performance of an operation by the client device.

2. The method of claim 1, wherein the validating further includes responsive to a successful match during the reattempt:
   identifying the second device as a trusted device;
   continuing the handshake process;
   communicating data with the second device related to the operation; and
   performing the operation.

3. The method of claim 1, further comprising responsive to a mismatch during the reattempt:
   identifying the second device as an untrusted device; and
   discontinuing the handshake process,
   wherein the re-attempt occurs only once.

4. The method of claim 1, wherein the communication session handshake process includes:
   a transport layer security (TLS) handshake process; or
   a secure sockets layer (SSL) handshake process.

5. The method of claim 1, further comprising:
   receiving core data from the system server, the received core data being signed by the private key of the system server; and
   validating the received core data using the seeded public key to ensure the received core data originates at the system server.

6. The method of claim 1, wherein the initiating the handshake process includes directly accessing the second device using an internet protocol address of the second device without a domain name system (DNS) name of the second device.

7. The method of claim 1, further comprising caching the received certificate list at the client device, wherein the received certificate list is cached for a particular period of time.

8. One or more non-transitory computer-readable media storing one or more programs that are configured, in response to execution by one or more processors, to cause a system to execute or control execution of operations, the operations comprising:
   receiving, at a client device, a public key of a system server;
   locally seeding the public key in a secure storage at the client device, wherein the seeding occurs when an agent is loaded on the client device;
   receiving a certificate list signed by a private key of the system server, the certificate list including one or more trusted device certificates associated with devices that are trusted by the system server;
   verifying a source of the certificate list using the seeded public key;
   initiating a communication session handshake process between the client device and a second device;
   receiving during the handshake process, a digital device certificate of the second device;
   halting the handshake process with the second device;
   during the halted handshake process, validating the second device using the digital device certificate of the second device based on the received certificate list having the verified source, the validating including:
      matching the received digital device certificate with one of the one or more trusted device certificates;
      responsive to a failure to match the received digital device certificate with the one or more trusted device certificates on the certificate list:
         communicating to the system server a request for a current certificate list, wherein the current certificate list includes one or more current trusted device certificates, and wherein the current certificate list is signed by the private key of the system server;
         verifying, by the client device, a signature on the current certificate list using the seeded public key; and
         reattempting to match the received digital device certificate of the second device with one of the one or more current trusted device certificates on the current certificate list; and
   based on the validating of the second device, managing a communication session with the second device to enable data transfer and performance of an operation by the client device.

9. The non-transitory computer-readable media of claim 8, wherein the validating further includes responsive to a successful match during the reattempt:
   identifying the second device as a trusted device; continuing the handshake process;
   communicating data with the second device related to the operation; and
   performing the operation.

10. The non-transitory computer-readable media of claim 8, wherein the operations further comprise responsive to a mismatch during the reattempt:
    identifying the second device as an untrusted device; and discontinuing the handshake process, wherein the re-attempt occurs only once.

11. The non-transitory computer-readable media of claim 8, wherein the communication session handshake process includes:
    a transport layer security (TLS) handshake process; or a secure sockets layer (SSL) handshake process.

12. The non-transitory computer-readable media of claim 8, wherein the operations further comprise:
    receiving core data from the system server, the received core data being signed by the private key of the system server; and
    validating the received core data using the seeded public key to ensure the received core data originates at the system server.

13. The non-transitory computer-readable media of claim 8, wherein the initiating the handshake process includes directly accessing the second device using an internet protocol address of the second device without a domain name system (DNS) name of the second device.

14. The non-transitory computer-readable media of claim 8, wherein the operations further comprise caching the received certificate list at the client device, wherein the received certificate list is cached for a particular period of time.

* * * * *